US011659511B2

(12) United States Patent
Baldemair et al.

(10) Patent No.: US 11,659,511 B2
(45) Date of Patent: *May 23, 2023

(54) METHODS AND ARRANGEMENTS IN A TELECOMMUNICATIONS NETWORK

(71) Applicant: Telefonaktiebolaget LM Ericsson (publ), Stockholm (SE)

(72) Inventors: Robert Baldemair, Solna (SE); David Astely, Bromma (SE); Erik Dahlman, Stockholm (SE); Ylva Jading, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,721

(22) Filed: Aug. 25, 2020

(65) Prior Publication Data

US 2020/0389862 A1    Dec. 10, 2020

Related U.S. Application Data

(63) Continuation of application No. 16/357,906, filed on Mar. 19, 2019, now Pat. No. 10,791,532, which is a
(Continued)

(51) Int. Cl.
*H04W 56/00* (2009.01)
*H04L 5/00* (2006.01)

(52) U.S. Cl.
CPC ......... *H04W 56/0045* (2013.01); *H04L 5/001* (2013.01); *H04W 56/0065* (2013.01)

(58) Field of Classification Search
CPC .............. H04W 56/0005; H04W 56/00; H04L 27/5655; H04L 27/2675
See application file for complete search history.

(56) References Cited

U.S. PATENT DOCUMENTS 5,831,974 A    11/1998  Suonvieri
6,396,827 B1    5/2002  Paivike et al.
(Continued)

FOREIGN PATENT DOCUMENTS

EP    2148517 A1    1/2010
EP    2230870 A1    9/2010
(Continued)

OTHER PUBLICATIONS

Unknown, Author, "Draft Report of 3GPP TSG RAN WG2 meeting #66", 3GPP TSG Working Group 2 meeting #66bis, R2-09xxxx, Los Angeles, CA, US, Jun. 29-Jul. 3, 2009.
(Continued)

*Primary Examiner* — Romani Ohri
(74) *Attorney, Agent, or Firm* — Murphy, Bilak & Homiller, PLLC

(57) ABSTRACT

The present invention relates to methods and arrangements in a base station and a user equipment for determining an uplink transmission timing correction for communication in a telecommunication system in which aggregation of component carriers is applied. The base station receives a signal from the user equipment on an uplink (UL) component carrier and measures the arrival time of the signal. A timing correction of the UL transmission timing based on the arrival time of the signal is determined. Thereupon the base station determines for which of the uplink component carriers used by the user equipment the timing correction is valid. The timing correction and the validity information is sent to the user equipment. The user equipment adjusts the UL transmission timing for each UL component carrier the timing correction is valid for.

8 Claims, 7 Drawing Sheets

Related U.S. Application Data continuation of application No. 14/532,781, filed on Nov. 4, 2014, now Pat. No. 10,285,150, which is a continuation of application No. 13/379,602, filed as application No. PCT/SE2010/050674 on Jun. 16, 2010, now Pat. No. 8,902,811.

(60) Provisional application No. 61/220,844, filed on Jun. 26, 2009.

(56) References Cited

U.S. PATENT DOCUMENTS

| | | | | |
|---|---|---|---|---|
| 8,634,313 | B2* | 1/2014 | Tenny | H04W 56/0045 370/336 |
| 2008/0002660 | A1* | 1/2008 | Jeong | H04L 5/023 370/350 |
| 2008/0013478 | A1* | 1/2008 | Rangan | H04L 5/0051 370/328 |
| 2009/0161654 | A1* | 6/2009 | Cai | H04B 7/2681 370/350 |
| 2010/0260136 | A1* | 10/2010 | Fan | H04W 72/0453 370/330 |
| 2011/0267957 | A1* | 11/2011 | Du | H04L 5/003 370/329 |
| 2012/0076105 | A1* | 3/2012 | Yang | H04L 5/0005 370/329 |

FOREIGN PATENT DOCUMENTS

| | | |
|---|---|---|
| EP | 2432286 A1 | 3/2012 |
| EP | 2525612 A1 | 11/2012 |
| JP | 2008277993 A | 11/2008 |
| RU | 2222102 C2 | 1/2004 |
| RU | 2294059 C2 | 2/2007 |
| WO | 9937037 A1 | 7/1999 |
| WO | 2008133310 A1 | 11/2008 |
| WO | 2008156180 A1 | 12/2008 |
| WO | 2009082332 A1 | 7/2009 |
| WO | 2010148404 A9 | 12/2010 |

OTHER PUBLICATIONS

Unknown, Author, "Issues in Carrier Aggregation", 3GPP TSG RAN WG1 Meeting #57bis, R1-092377, Los Angeles, CA, US, Jun. 29-Jul. 3, 2009.
Unknown, Author, "PDCCH Design for Carrier Aggregation", Panasonic 3GPP TSG-RAN WG1 Meeting #57; R1-091743. May 4-8, 2009. pp. 1-9. San Francisco, California, US.
Unknown, Author, "Reply LS on RAN2 Status on Carrier Aggregation", TSG-RAN Wg4. 3GPP TSG RAN WG4 MEeting #51bis; R4-092488. Jun. 29-Jul. 2, 2009. pp. 1-3. Los Angeles, California, US.
Unknown, Author, "Views on Remaining Issues on UL Sounding RS for E-UTRA", Motorola 3GPP TSG RAN WG1 #51; R1-074574. Nov. 5-9, 2007. pp. 1-7. Jeju, Korea.
"IPR Declaration", Mar. 19, 2021, 150 pages.
"IPR Dismissal Prior to Institution of Trial", Aug. 3, 2021, 13 pages.
"IPR Petition", Mar. 19, 2021, 86 pages.
"Timing Alignment in a Multicarrier System", U.S. Appl. No. 61/218,769, 39 pages.
Wang, Yuanye, et al., "Resource Allocation Considerations for Multi-Carrier LTE-Advanced Systems Operating in Backward Compatible Mode", IEEE, 2009, 5 pages.
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.6.0, Jun. 2009, 47 pages.
"3rd Generation Partnership Project; Technical Specification Group Radio Access Network; Evolved Universal Terrestrial Radio Access (E-UTRA); Physical Channels and Modulation (Release 8)", 3GPP TS 36.211 V8.7.0, May 2009, 83 pages.
"3rd Generation Partnership Project; Technical Specification Group Radio Access Network; Evolved Universal Terrestrial Radio Access (E-UTRA); Physical layer procedures (Release 8) The present document has been developed within the 3rd Generation Partnership", 3GPP TS 36.213 V8.7.0, May 2009, 77 pages.
"Draft Report of 3GPP TSG RAN WG2 meeting #66", TSG-RAN Working Group 2 meeting #66bis, R2-09xxxx, ETSI MCC, Los Angeles, USA, Jun. 29-Jul. 3, 2009, 135 pages.
"Supporting multiple timing advance groups", 3GPP TSG-RAN WG2 meeting#68bis, R2-100423, Qualcomm Incorporated, Valencia, Spain, Jan. 18-22, 2010, 3 pages.
"IPR Declaration of Dr. Robert Akl, D. Sc.", Mar. 19, 2021, 153 pages.

* cited by examiner

METHODS AND ARRANGEMENTS IN A TELECOMMUNICATIONS NETWORK

RELATED APPLICATIONS

This application is a continuation of U.S. application Ser. No. 16/357,906 filed on 19 Mar. 2019, which is a continuation of U.S. application Ser. No. 14/532,781 filed on 4 Nov. 2014 and issued as U.S. Pat. No. 10,285,150, which is a continuation of U.S. application Ser. No. 13/379,602 filed on 20 Dec. 2011 and issued as U.S. Pat. No. 8,902,811, which is the National Phase Application of PCT/SE2010/050674 filed on 16 Jun. 2010, which claims benefit of Provisional Application No. 61/220,844 filed on 26 Jun. 2009. The entire contents of each aforementioned application is incorporated herein by reference.

TECHNICAL FIELD

The present invention relates to arrangements and methods in a telecommunications system, and in particular transmission timing alignment in a telecommunications system in which aggregation of component carriers is applied.

BACKGROUND

FIG. 1 shows a part of a telecommunication network 10. The radio access network 10 comprises a plurality of radio base stations 11 (whereof only one is shown in the figure), each of which communicates with a plurality of UEs (user equipments) 12 located in the coverage area of the radio base station. The base station 11 further communicates with a core network 13. For example, where the network 10 is a standardized E-UTRAN (Evolved UMTS Terrestrial Radio Access Network), the core network 13 comprises an evolved packet core, itself comprising a mobility management entity (MME), a serving gateway and a PDN (packet data network) gateway.

The E-UTRAN currently supports bandwidths up to 20 MHz. However, one of the requirements of future releases of this standard such as LTE Advanced is the support of bandwidths larger than 20 MHz. A further important future requirement is to assure backward compatibility with previous releases. This also includes spectrum compatibility. That implies that a future-release carrier, wider than 20 MHz, appears as a number of carriers to a legacy UE. Each such carrier can be referred to as a component carrier. In particular for early deployments of future releases, it can be expected that there will be a smaller number of future-release UEs compared to many legacy UEs. Therefore, it is necessary to assure an efficient use of a wide carrier also for legacy UEs, i.e. that it is possible to implement carriers where legacy UEs can be scheduled in all parts of the wideband future-release carrier. The straightforward way to obtain this is by means of carrier aggregation. Carrier aggregation implies that a future-release UE can receive multiple component carriers, where the component carriers have, or at least have the possibility of having, the same structure as a carrier of previous releases.

Different examples of carrier aggregation are illustrated in FIGS. 2a to 2c. A contiguous intra-band carrier aggregation is illustrated in FIG. 2a where five component carriers 20, each of 20 MHz bandwidth, have been aggregated to form a bandwidth of 100 MHz. FIG. 2b illustrates a non-contiguous intra-band carrier aggregation where three component carriers 20, each of 20 MHz bandwidth, have been aggregated together to form an aggregated bandwidth of 60 MHz. Finally, FIG. 2c illustrates an inter-band carrier aggregation where two component carriers 20 in band x and band y respectively, each of 20 MHz bandwidth, have been aggregated together to form an aggregated bandwidth of 40 MHz.

The number of aggregated component carriers as well as the bandwidth of the individual component carrier may be different for uplink (UL) and downlink (DL). A symmetric configuration refers to the case where the number of component carriers in DL and UL is the same whereas an asymmetric configuration refers to the case that the number of component carriers is different. It should be noted that the number of component carriers configured in a network might be different from the number of component carriers seen by a UE. A UE may for example support more DL component carriers than UL component carriers, even though the network is configured with the same number of UL and DL component carriers.

The current E-UTRAN but also LTE Advanced uses DFTS-OFDM (Discrete Fourier Transform Spread-Orthogonal Frequency Division Multiplex) for modulation in the UL. DFTS-OFDM is a special kind of FDM (Frequency Division Multiplex) where different users are assigned different portions of the spectrum. Orthogonality among different users relies on the time-aligned arrival of the UL signals of the various users. In current E-UTRAN and LTE Advanced a cyclic prefix is used which relaxes the requirement on timing alignment slightly. Hence, it is sufficient if the signals are aligned within a fraction of the cyclic prefix. The normal cyclic prefix in LTE is around 5 µs; signals from different users should then be aligned within 1 µs or so.

UEs synchronize their DL timings to DL signals transmitted from an eNodeB. i.e. a radio base station of an E-UTRAN. Signals used for this purpose comprise synchronization signals and reference signals. After established downlink synchronization a UE can start to transmit signals in the UL from the UE to the eNodeB at a well-defined offset relative to the DL timing. However, due to varying UE-eNodeB distances among UEs the synchronization signals arrive at different time instances at the UEs creating UE specific DL timings at each UE. This results in different transmission instances among the UEs. UEs close to the eNodeB receive the synchronization signal early and thus also start to transmit early; their respective UL signals require furthermore only a short propagation time to arrive at the eNodeB. UEs far away from the eNodeB start to transmit later and their UL signals require also more time to traverse the distance to the eNodeB resulting in later signal arrival times at the eNodeB. The time difference between arriving signals from two UEs is the difference in round trip time between these two UEs. Round trip time is defined as the time duration that is needed for a signal to traverse the distance eNodeB-UE and back (assuming zero processing delay at the UE) and is calculated as twice the distance eNodeB-UE divided by the speed of light.

In order to align the arrival times of UL signals from different UEs the eNodeB measures the arrival times of the different signals relative to a desired arrival time reference and informs the UEs by how much they have to advance/delay their UL transmission timings (either relative to their UE specific DL timings or to the current UL transmission timing). This process is called timing alignment procedure and the command used to notify the UE about the required correction is called timing advance command.

In case of a UE with completely unsynchronized UL timing the UE does not transmit a regular UL signal but a random access signal. This signal is specifically designed for unsynchronized UEs. After the eNodeB has determined the required correction of UL transmit timing it transmits a corresponding timing advance command to the UE, which corrects its UL timing accordingly. After that the UE can now start to transmit regular UL signals, which assume aligned arrival timings. The eNodeB continuously monitors UL signal arrival timings and sends timing advance commands to maintain a valid UL timing. If a UE is not active in the UL for a long time or looses UL synchronization for another reason a new random access needs to be performed to establish a valid UL timing again.

In case of UL carrier aggregation all UL signals within a component carrier and/or across contiguous component carriers need to be timing aligned in order to maintain orthogonality.

SUMMARY

It is therefore an object of the present invention to provide a solution for transmission timing alignment in a telecommunication system in which aggregation of component carriers is applied.

The above stated object is achieved by means of methods and arrangements according to the independent claims, and by the embodiments according to the dependent claims.

According to a first aspect of the present invention, a method in a base station (600) for determining an uplink transmission timing correction for communication in a telecommunication system is provided. Aggregation of component carriers is applied in the telecommunication system. The method comprising receiving a signal on a selected uplink component carrier from a user equipment. An arrival time of the received signal is measured and a timing correction of the uplink transmission timing based on the measured arrival time is determined. Furthermore the method comprises the step of determining for which of the uplink component carriers used by the user equipment the determined timing correction is valid. Additionally, the method comprises the step of sending the timing correction and information on which of the uplink component carriers the timing correction is valid for to the user equipment.

According to a second aspect of the present invention, a method in a user equipment for determining an uplink transmission timing correction for communication in a telecommunication system is provided. Aggregation of component carriers is applied in the telecommunication system. The method comprises the step of sending a signal on an uplink component carrier to a base station. Furthermore, a timing correction of the uplink transmission timing and information on which uplink component carrier the timing correction is valid for is received from the base station. Thereupon, the method in the user equipment adjusts the uplink transmission timing of the component carrier the timing correction is valid for based on the timing correction.

According to a third aspect of the present invention, a base station for determining an uplink transmission timing correction for communication in a telecommunication system is provided. Aggregation of component carriers is applied in the telecommunication system. The base station comprises a receiver for receiving a signal on a selected uplink component carrier from a user equipment and a unit for measuring an arrival time of the received signal. The base station further includes a unit for determining a timing correction of the uplink transmission timing based on the measured arrival time and for determining for which of the uplink component carriers used by the user equipment the determined timing correction is valid. Additionally, a transmitter for sending the timing correction and information on which of the uplink component carriers the timing correction is valid for to the user equipment is comprised in the base station.

According to a fourth aspect of the present invention, a user equipment for determining an uplink transmission timing correction for communication in a telecommunication system is provided. Aggregation of component carriers is applied in the telecommunication system. The user equipment comprises a transmitter for sending a signal on an uplink component carrier to a base station. Moreover, the user equipment includes a receiver for receiving a timing correction of the uplink transmission timing and information on which uplink component carrier the timing correction is valid for from the base station. Additionally, a unit for adjusting the uplink transmission timing of the component carrier the timing correction is valid for based on the timing correction is comprised in the user equipment.

An advantage of embodiments of the present invention is that they provide a possibility to use only one timing correction for all component carriers. e.g. a single UL timing advance command, when possible and reverts back to a timing correction for each component carrier, e.g. multiple UL timing advance commands, only if required.

Another advantage of embodiments of the present invention is that they reduce the signal overhead in the telecommunication system.

Yet another advantage of embodiments of the present invention is that the complexity of the processing of the user equipment is reduced when a single timing correction. e.g. one common timing advance command, is used for several component carriers.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1:
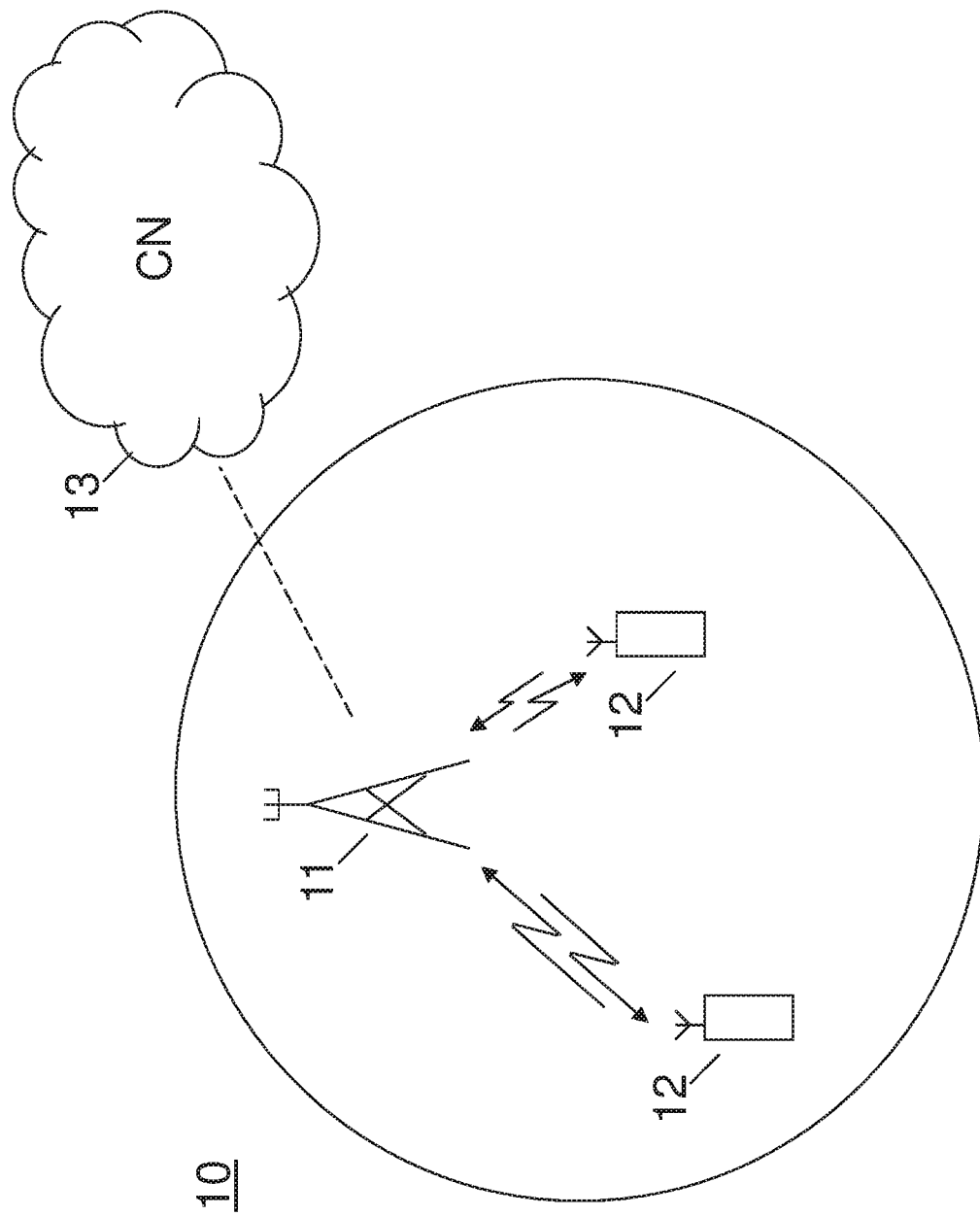
FIG. 1 depicts schematically a telecommunication system, wherein embodiments of the present invention may be implemented.
Figure 2:
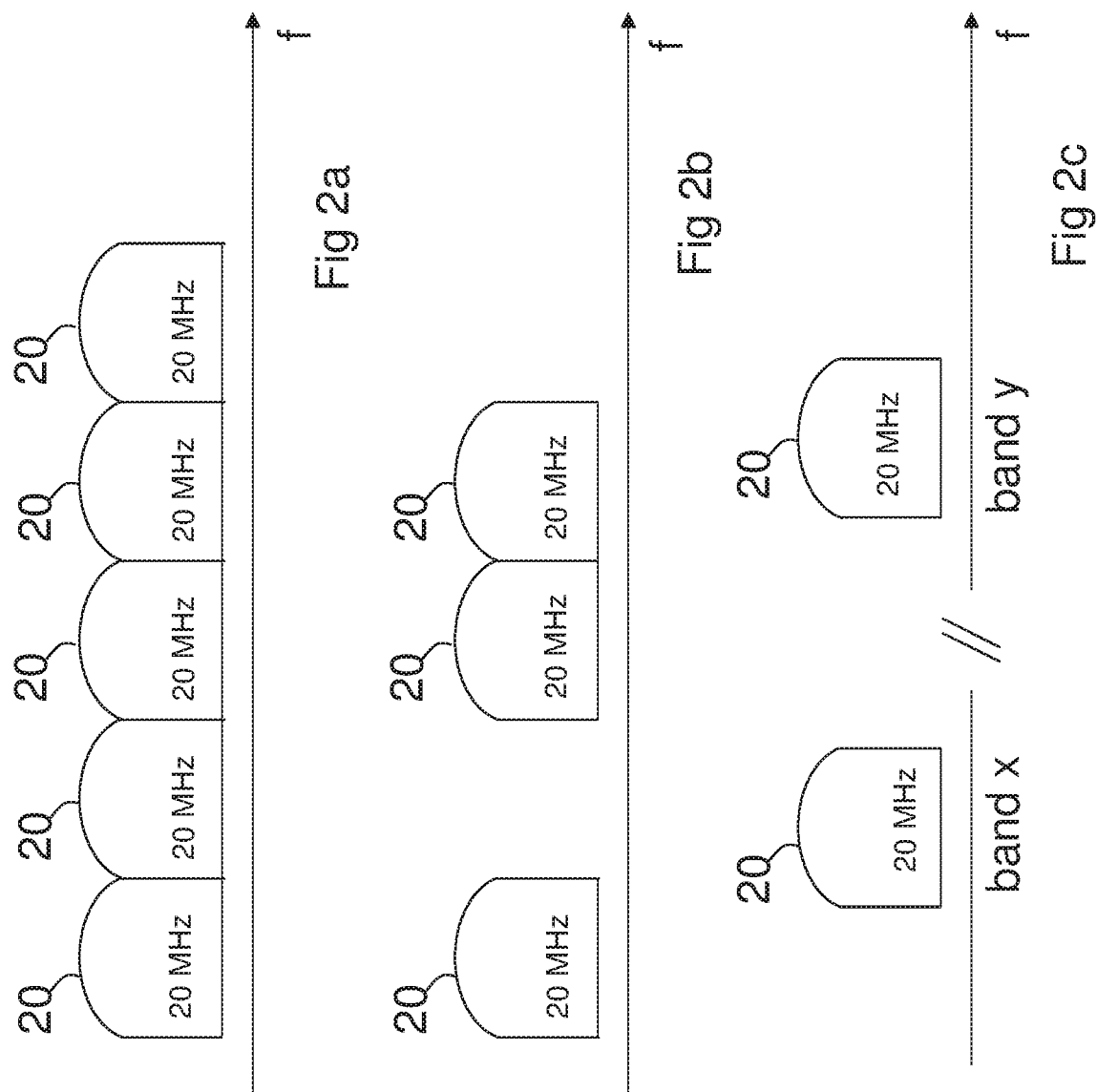
FIGS. 2*a* to 2*c* show different examples of carrier aggregation.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practiced in other embodiments that depart from these specific details. In the drawings, like reference signs refer to like elements.

Moreover, those skilled in the art will appreciate that the means and functions explained herein below may be implemented using software functioning in conjunction with a programmed microprocessor or general-purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an E-UTRAN. It should though be noted that the invention and its exemplary embodiments are applicable to other types of radio access networks in which aggregation of component carriers is applied.

In a telecommunication system in which aggregation of UL component carriers is applied all UL signals within a component carrier and/or across contiguous component carriers need to be timing aligned in order to maintain orthogonality.

The arrival time of two or more UL component carriers at the base station is influenced by the transmission timing of each respective UL carrier as well as the propagation delay experienced by each UL signal. However in most cases, the arrival time of the UL component carrier is mainly determined by the transmission timing.

According to the basic concept of the present invention, the base station receives a signal from a user equipment on an UL component carrier and measures the arrival time of the signal. A timing correction of the UL transmission timing based on the arrival time of the signal is determined. Thereupon the base station determines for which of the uplink component carriers used by the user equipment the timing correction is valid. The timing correction and the validity information are sent to the user equipment. The user equipment adjusts the UL transmission timing for each UL component carrier the timing correction is valid for.

A message carrying the information for which UL component carrier the timing correction is valid can either be an independent message or it can be sent together with the timing correction. An independent signaling of validity information can for example be signaled via RRC (Radio Resource Control) signaling or MAC (Media Access Control) control elements. A combined message carrying both timing correction and validity information is typically signaled as MAC control element but other signaling schemes are possible as well. In one embodiment of the present invention the timing correction is sent in a timing advance command to the user equipment.

Figure 3:
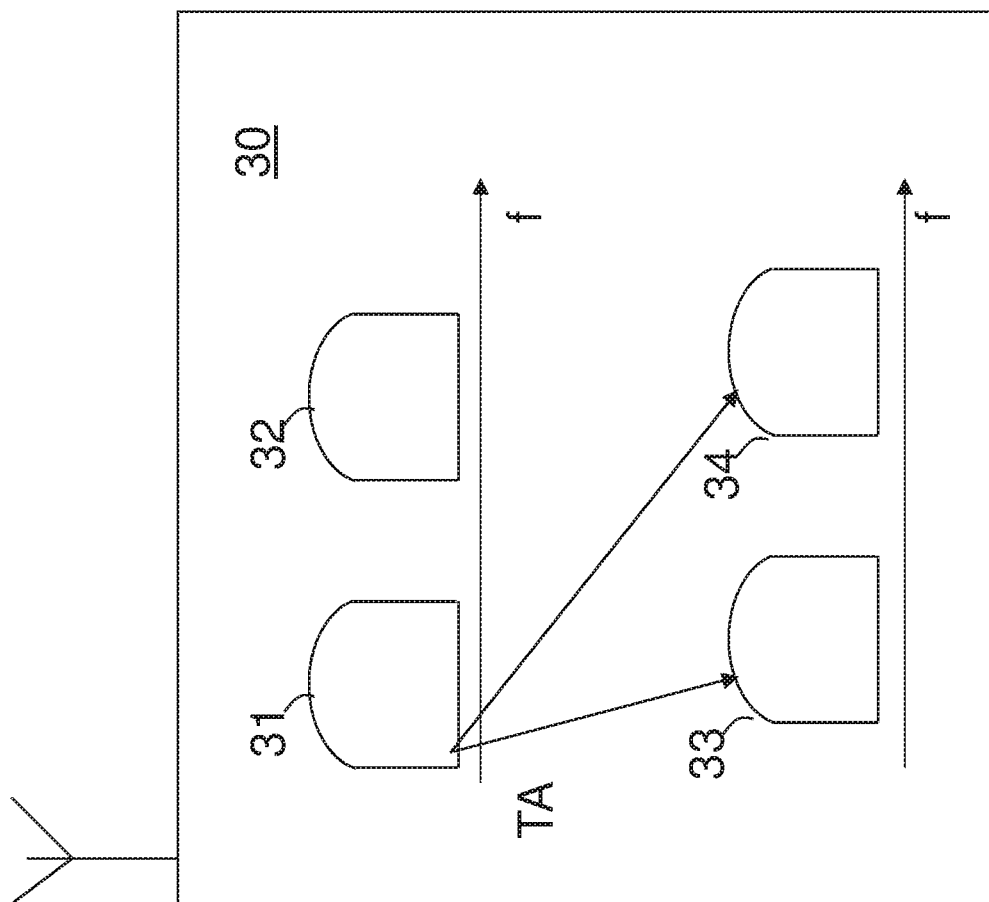
FIG. 3 is a schematic block diagram illustrating an embodiment of the present invention wherein the DL timing references are related to each other.

In one embodiment of the present invention the UL component carriers used by a user equipment are associated with a common DL timing reference—and thus should have the same UL transmit timing—and should have the same UL receive timing, one timing advance command is sufficient for all UL component carriers used by the user equipment. The same also applies if they use different—but well defined with respect to each other — DL timing references. The UL transmit timings and thus also the UL receive timings will have the same relationship to each other as the DL timing references. FIG. 3 shows a user equipment 30 which is configured with a first DL component carrier 31 and a second DL component carrier 32 and a first UL component carrier 33 and a second UL component carrier 34. Both the first and the second UL component carrier 33, 34 derive their UL transmission timings from the first DL component carrier 31. Thus, only one timing advance command TA is needed.

A common DL timing reference could be for example the synchronization signal or the reference signals of one DL component carrier. Another example of a common DL timing reference could be synchronization signals on different component carriers if they are synchronized. DL timing references that are not the same but anyway share a well-defined relation with each other could be synchronization signals on DL component carriers where the transmit timings are not the same but have a clearly defined offset relative to each other.

Figure 4:
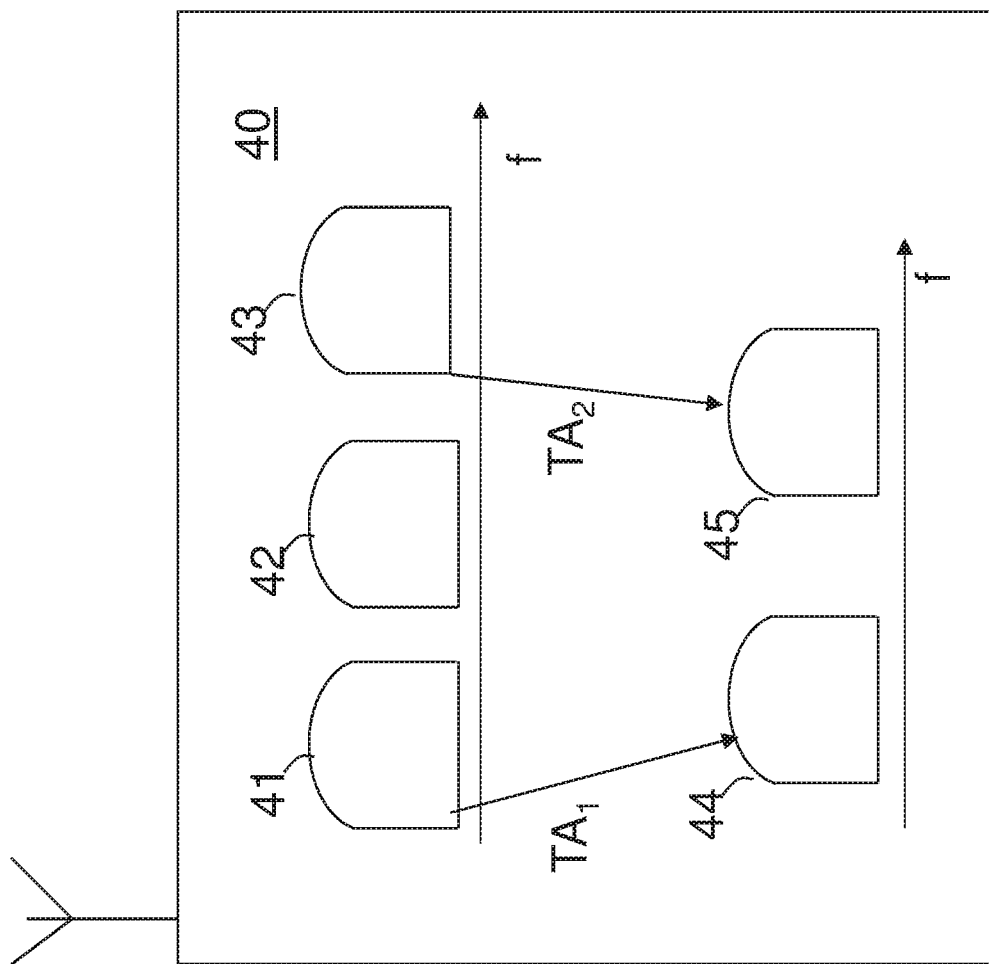
FIG. 4 is a schematic block diagram illustrating an embodiment of the present invention wherein the DL timing references are not related to each other.

In another embodiment of the present invention the DL timing references are not related to each other. FIG. 4 shows a user equipment 40, which is configured with a first DL component carrier 41, a second DL component carrier 42 and a third DL component carrier 43. It is further configured with a first UL component carrier 44 and a second UL component carrier 45. The DL timing reference of the first DL component carrier 41 is not related to the DL timing reference of the third DL component carrier 43. In order to guarantee clearly defined UL receive timings for both UL component carriers, individual UL timing advance commands for each UL component carrier are required. Thus, the first UL component carrier 44 derives its UL transmission timing from the first DL component carrier 41 and the second UL component carrier 45 derives its UL transmission timing from the third DL component carrier 43. Thus, the user equipment receives a first timing advance command TA1 and a second timing advance command TA2.

An example where an UL timing advance command for each UL component carrier should be used is in a case with aggregation of multiple time-division duplex (TDD) component carriers with different DL and UL allocations across them. Since TDD DL transmitters are typically timing aligned with neighboring TDD DL transmitters to mitigate interference it is necessary that each of the TDD component carriers can set their DL timing references individually. Due to possible different DL and UL allocations, individual UL receive timings are required which makes individual UL timing advance commands necessary.

In the following the above embodiments will be further explained with reference to FIGS. 5a-b, 6 and 7.

Figure 5:
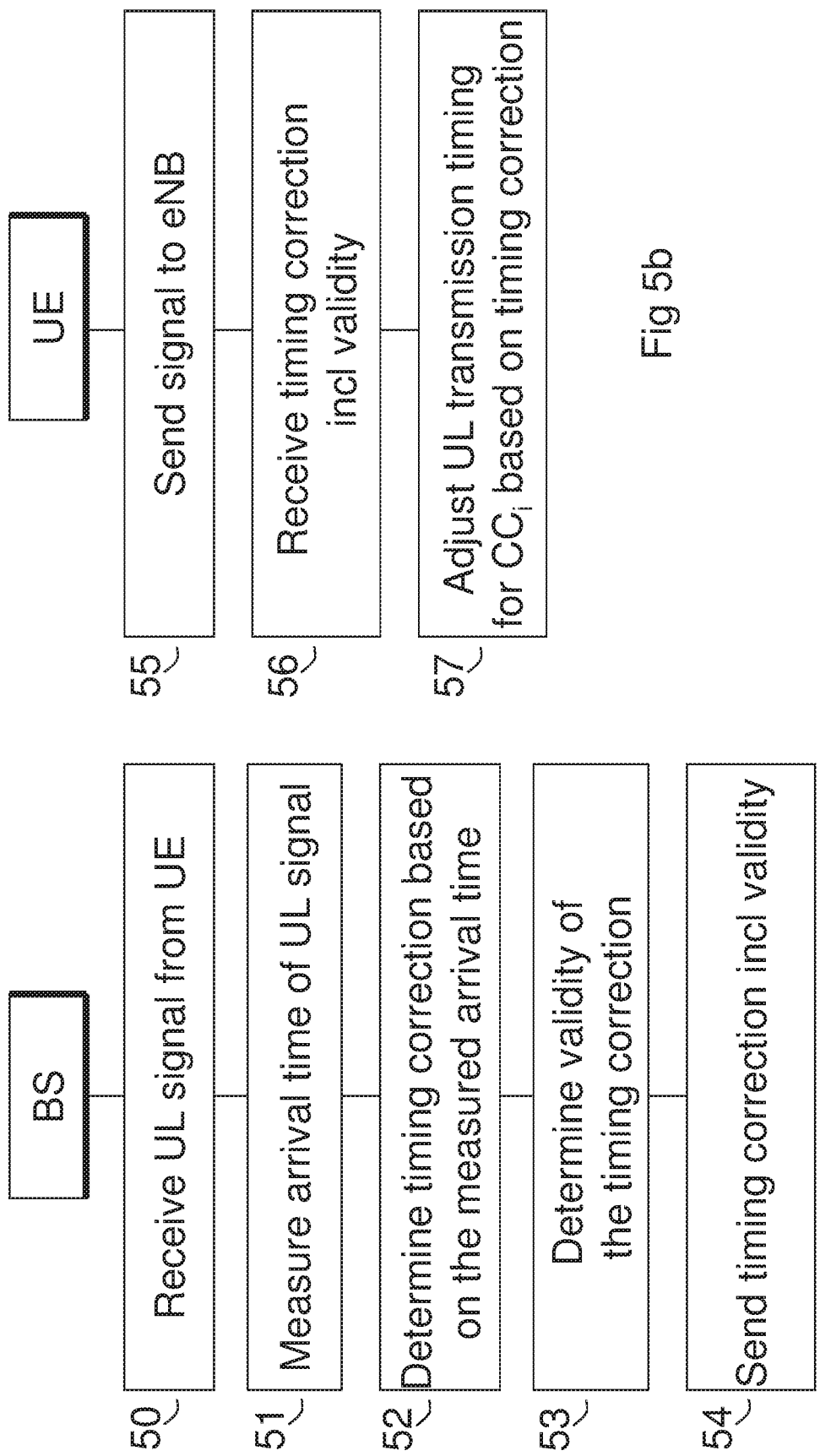
FIGS. 5*a* and 5*b* are flowcharts of the method according to an embodiment of the present invention performed in the base station and the user equipment, respectively.

FIG. 5a is a flowchart of a method in a base station (BS) for determining an uplink transmission timing correction for communication in a telecommunication system of the present invention. Aggregation of component carriers is applied in the telecommunication system. In a step 50, the base station receives a signal on a selected uplink component carrier of several aggregated component carriers from a user equipment. Next, the base station measures an arrival time of the received signal in a step 51. Thereupon, in a step 52, the base station determines a timing correction of the uplink transmission, i.e. the timing correction that is to be applied on the uplink transmissions from the UE, based on the measured arrival time. In next step 53, the validity of the timing correction is determined. That is, it is determined for which of the uplink component carriers used by the user equipment the determined timing correction is valid. In one embodiment the mentioned determination is based on a downlink timing reference associated with the respective uplink component carrier used by the user equipment.

In a step 54, the timing correction and the information on which of the uplink component carriers the timing correction is valid for are sent to the user equipment. This could be executed in different ways. A message carrying the information for which UL component carrier the timing correction is valid can either be an independent message or it can be sent together with the timing correction. An independent signaling of the information on which component carrier the timing correction is valid for could be done with RRC signaling or with MAC control elements. A combined message carrying both timing correction and validity information is typically signaled as MAC control element but other signaling schemes are possible as well. In one embodiment of the present invention the timing correction is sent in a timing advance command to the user equipment.

In one embodiment, the timing correction could be determined to be valid for the uplink component carrier of the aggregated component carriers which has an associated downlink timing reference aligned with the downlink timing reference associated with the selected uplink component carrier. In such a case the downlink timing reference could be a synchronization signal or reference signal of one of the downlink component carrier used by the user equipment.

In another embodiment were the downlink timing reference associated with a component carrier is not the same but has a well-defined relation with the downlink timing reference associated with the selected component carrier, the timing correction could be determined to be valid for said uplink component carrier. That is, the timing correction is determined to be valid for all uplink component carriers which have an associated downlink timing reference with a defined offset relative to the downlink timing reference associated with the selected uplink component carrier on which the signal is received from the user equipment in step 50. In this case, the downlink timing references could be synchronization signals or reference signals on different downlink component carriers.

It should be pointed out that the validity information. i.e. the validity of the timing correction, is in one embodiment of the present invention determined during setup of the base station and sent to the UE when an UL component carrier is added. Thus, the validity information could be sent to the UE before the timing correction is sent to the UE and also less frequent than the timing correction.

In an exemplary embodiment of the present invention the base station measures the arrival time of the signal received from the UE and relates the measured time to an arrival time reference. The arrival time reference could be the arrival time that the base station desires to receive a signal from the UE. Thus, the timing correction determined by the base station could be based on the measured arrival time of the received signal and the arrival time reference.

FIG. 5*b* is a flowchart of a method in a user equipment for determining an uplink transmission timing correction for communication in a telecommunication system of the present invention. Aggregation of component carriers is applied in the telecommunication system. In a step 55, the user equipment sends a signal on a selected uplink component carrier of several aggregated component carriers to the base station. Thereupon, the user equipment receives from the base station a timing correction of the uplink transmission timing and information on which uplink component carrier the timing correction is valid for in a step 56. As mention previously, this step could be executed in different ways. A message carrying the information for which UL component carrier the timing correction is valid can either be an independent message or it can be received together with the timing correction. An independent signaling of the information on which component carrier the timing correction is valid for could be done with RRC signaling or with MAC control elements. A combined message carrying both timing correction and validity information is typically received as MAC control element but other signaling schemes are possible as well. In one embodiment the timing correction is received by the user equipment in a timing advance command.

In another embodiment when the component carriers are time division duplex carriers with different downlink or uplink allocations across the carriers, the timing correction is determined to be valid for only the selected component carrier.

Figure 6:
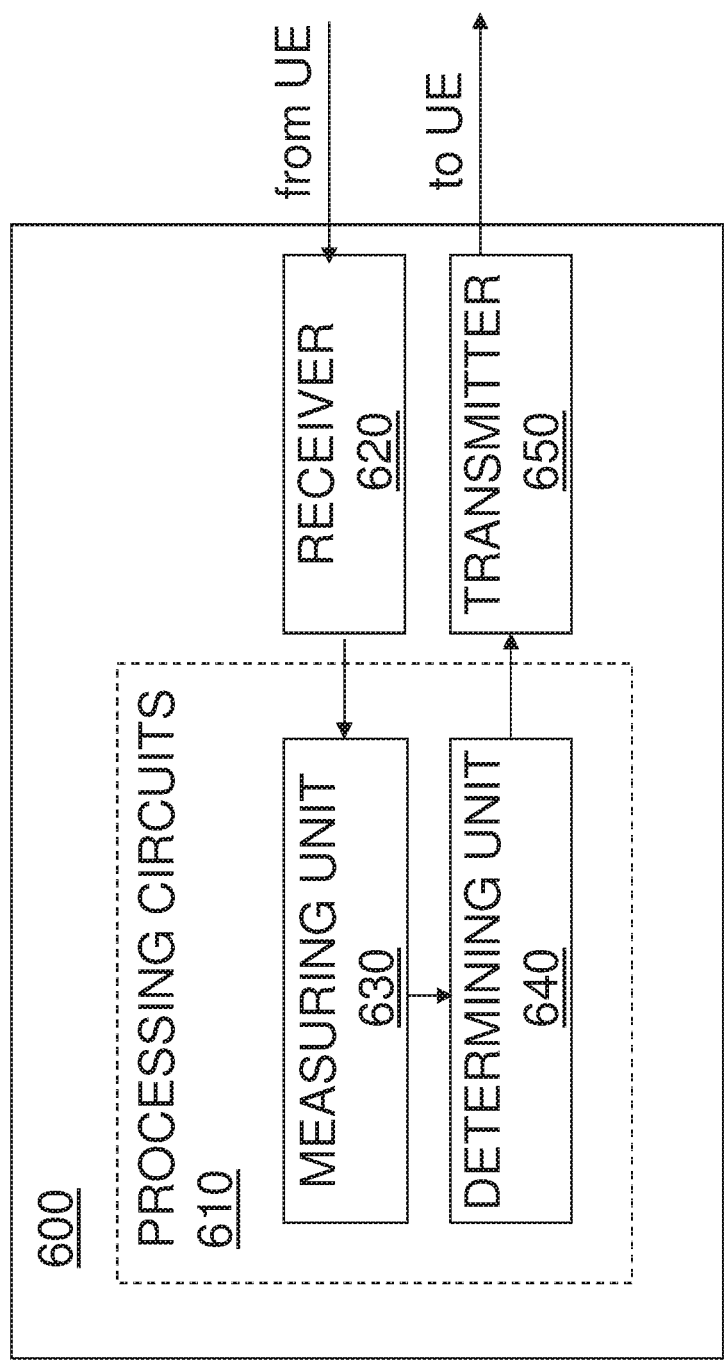
FIG. 6 is a schematic block diagram illustrating a base station according to an embodiment of the present invention.

Schematically illustrated in FIG. 6 and according to embodiments described above, the base station 600 comprises a receiver 620 for receiving a signal on a selected uplink component carrier from a user equipment and a unit for measuring 630 an arrival time of the received signal. It further comprises at least one unit for determining 640 a timing correction of the uplink transmission timing based on the measured arrival time and for determining for which of the uplink component carriers used by the user equipment the determined timing correction is valid. Finally, a transmitter 650 is comprised in the base station for sending the timing correction and information on which of the uplink component carriers the timing correction is valid for to the user equipment.

Figure 7:
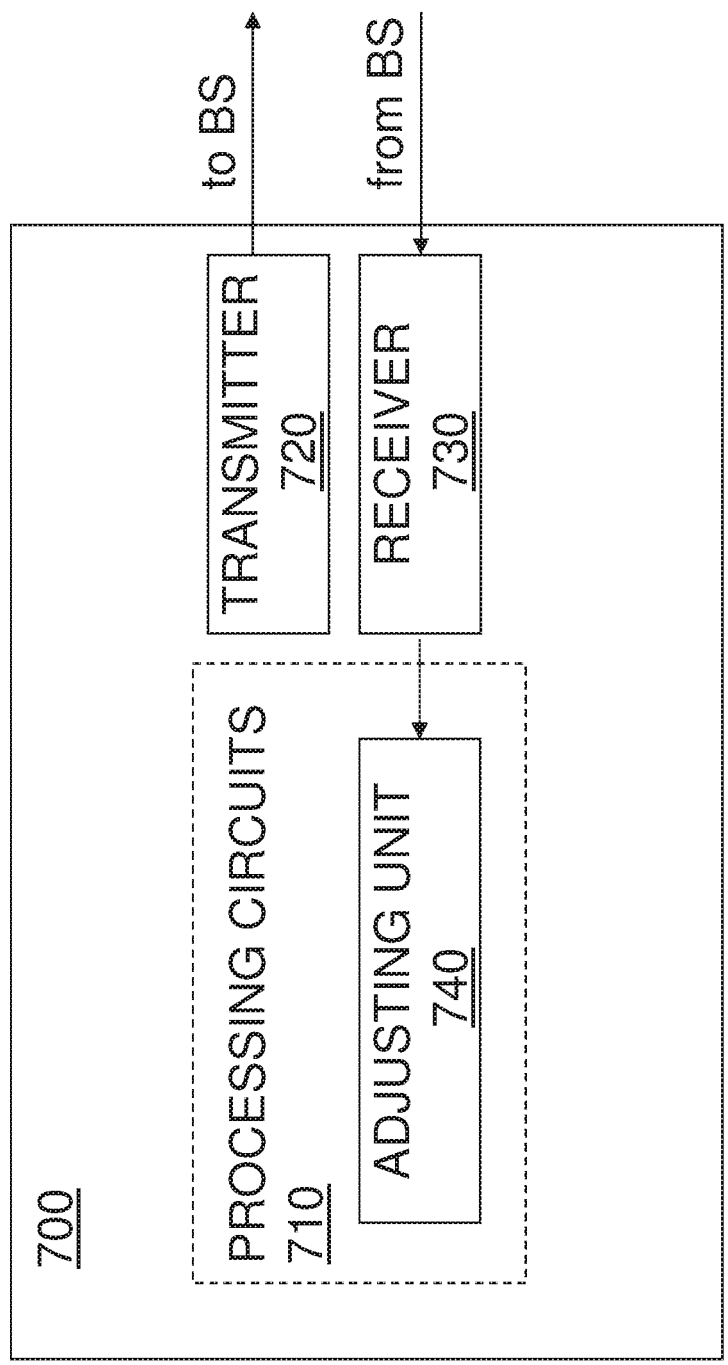
FIG. 7 is a schematic block diagram illustrating a user equipment according to an embodiment of the present invention.

Schematically illustrated in FIG. 7 and according to embodiments described above, the user equipment 700 comprises a transmitter 720 for sending a signal on a selected uplink component carrier to a base station and a receiver 730 for receiving a timing correction of the uplink transmission timing and information on which uplink component carrier the timing correction is valid for from the base station. It further includes a unit for adjusting 740 the uplink transmission timing of the component carrier the timing correction is valid for based on the timing correction.

It should be noted that the units illustrated in FIGS. 6 and 7, respectively, could be implemented as a single unit or be divided into several units. The units may be implemented as physical or logical entities, such as by processing circuits 610, 710. In general, such units comprise processing circuitry, such as may be implemented via the programmatic configuration of a microprocessor or a general-purpose computer via the execution of software—e.g., the execution of computer program instructions stored in a non-transitory computer-readable medium. Additionally or alternatively, the processing units in question are implemented using an application specific integrated circuit (ASIC).

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A base station for determining an uplink transmission timing correction for communication in a telecommunication system, the base station comprising:
   a receiver for receiving an uplink (UL) signal on a selected UL component carrier from a user equipment, the selected UL component carrier being one among multiple UL component carriers comprised in an aggregation of Time Division Duplex (TDD) component carriers configured for the UE, each TDD component carrier having an UL allocation and a downlink (DL) allocation, and wherein two or more of the TDD component carriers have different UL and DL allocations;

a unit for measuring an arrival time of the UL signal, where the arrival time at the base station is influenced by a respective UL transmission timing used by the UE for the selected UL component carrier, as well as the propagation delay experienced by the UL signal;

a unit for determining a timing correction of the UL transmission timing based on the measured arrival time, and for determining for which further UL component carriers comprised in the aggregation of TDD component carriers the determined timing correction is valid, wherein the timing correction is determined to be valid for each further UL component carrier that has an associated DL timing reference aligned with a DL timing reference associated with the selected UL component carrier; and a transmitter for sending to the user equipment the timing correction and information indicating for which of the further UL component carriers the timing correction is valid.

2. The base station of claim 1, wherein the associated DL timing reference of each UL component carrier comprised in the aggregation of TDD component carriers is an associated DL synchronization signal or reference signal.

3. The base station of claim 1, wherein the associated DL timing reference of any further UL component carrier comprised in the aggregation of TDD component carriers is considered to be aligned with the associated DL timing reference of the selected UL component carrier if the associated DL timing reference of the further UL component carrier has a defined offset relative to the associated DL timing reference of the selected UL component carrier.

4. The base station of claim 1, wherein all TDD component carriers in the aggregation have different UL and DL allocations.

5. The base station of claim 1, wherein the information indicating for which of the further UL component carriers the timing correction is valid is sent via Radio Resource Control (RRC) signaling.

6. The base station of claim 1, wherein the information indicating for which of the further UL component carriers the timing correction is valid is signaled with Medium Access Control (MAC) control elements.

7. A method performed by a base station, the method comprising:

measuring an arrival time of an Uplink (UL) signal received via a receiver of the base station, the UL signal transmitted by a User Equipment (UE) on a selected UL component carrier, the selected UL component carrier being one among multiple UL component carriers comprised in an aggregation of Time Division Duplex (TDD) component carriers configured for the UE, wherein the arrival time depends upon an UL transmission timing used by the UE for transmitting on the selected UL component carrier, each TDD component carrier having an UL allocation and a downlink (DL) allocation, and wherein two or more of the TDD component carriers have different UL and DL allocations;

determining a timing correction for the UL transmission timing and determining for which further UL component carriers comprised in the aggregation of multiple TDD component carriers the timing correction is valid, wherein the timing correction is determined to be valid for each further UL component carrier comprised in the aggregation of TDD component carriers that has an associated DL timing reference aligned with a DL timing reference associated with the selected UL component carrier; and transmitting, via the transmitter, signaling indicating the timing correction and the further UL component carriers for which the timing correction is valid.

8. A base station comprising:

a receiver configured to receive an Uplink (UL) signal from a User Equipment (UE), the UL signal received on a certain UL component carrier among multiple UL component carriers comprised in an aggregation of Time Division Duplex (TDD) carriers configured for the UE, each TDD component carrier having an UL allocation and a downlink (DL) allocation, and wherein two or more of the TDD component carriers have different UL and DL allocations; and processing circuitry configured to:
  determine a timing correction for an UL transmission timing used by the UE for transmitting the UL signal, the timing correction based on an arrival time measured for the UL signal;
  identify further UL component carriers comprised in the aggregation of TDD component carriers of the UE for which the timing correction is valid, the identified UL component carriers referenced to a DL timing referenced used for the certain UL component carrier, or referenced to a DL timing reference that depends on the DL timing reference used for the certain UL component carrier; and
  send, via a transmitter of the base station, signaling to the UE indicating the timing correction and the identified UL component carriers.

* * * * *